UNITED STATES PATENT OFFICE.

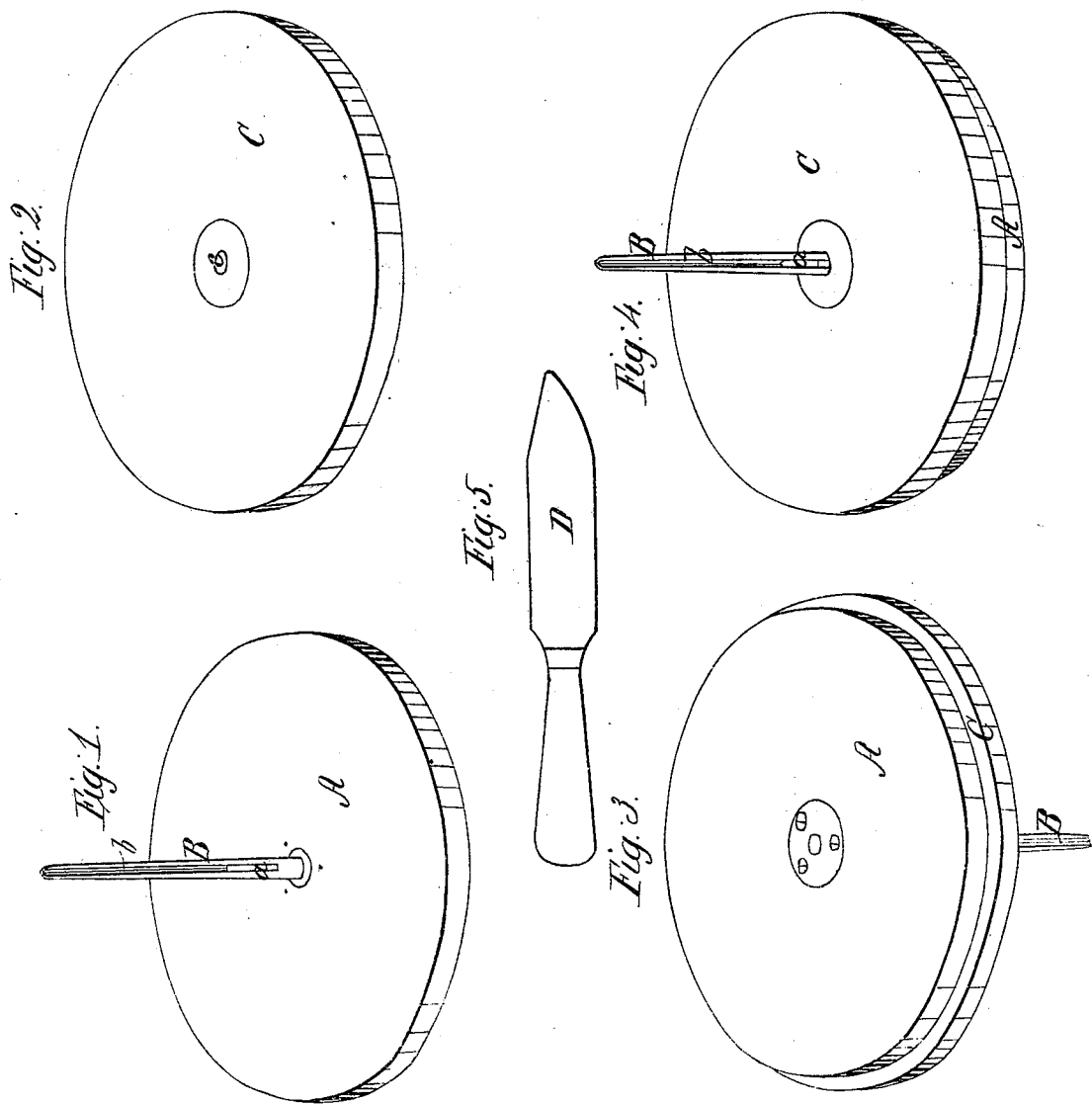

WALTER K. FOSTER, OF BANGOR, MAINE.

MACHINE FOR CUTTING CHEESE.

Specification of Letters Patent No. 9,214, dated August 24, 1852.

*To all whom it may concern:*

Be it known that I, WALTER K. FOSTER, of Bangor, in the county of Penobscot and State of Maine, have invented a new and useful Machine to be Used in Cutting Cheese into Sectional Slices or Pieces; and I do hereby declare that the same is fully described and represented in the following specification and the accompanying drawings, letters, figures, and references thereof.

Of the said drawings, Figure 1 denotes a perspective elevation of my machine. Fig. 2 is a perspective view of the secondary rotary board. Fig. 3 is a perspective underside view of the machine. Fig. 4 is a perspective elevation of it.

In the said drawings, A, denotes a circular or other proper shaped plate or board having a round tapering spindle B standing perpendicularly to its upper surface and from the central part of it. A short distance above the upper surface of the board A, there is a slot or mortise made through the spindle as seen at $a$, in Figs. 1 and 4. A groove $b$ is also made in the side of the spindle and from its top down to the slot or mortise $a$.

Another board C which I generally make circular and of a diameter somewhat larger than that of the ordinary size of cheeses sold in the market, has a round hole $c$ made through its middle of such a size as will enable me to place it on the spindle and cause it to rest on the board A and freely rotate on the spindle.

In cutting a cheese it is placed with its central part on the point of the spindle. It is next held horizontally and suffered or caused to descend and rest upon the board C, the spindle passing entirely through it. A knife D, having a pointed end as seen in Fig. 5, has its point inserted in the groove $b$, and is forced down into the cheese until its end passes into the slot $a$. The handle of the knife is next borne down until the cutting edge of the blade passes entirely through the cheese and rests upon the top surface of the board C. The knife is next to be removed, and the board C with the cheese on it turned around the number of degrees required on the arc of the sectional piece to be cut from the cheese. The knife is next passed into and down the groove $b$, and the process of cutting down through the cheese is carried on as before.

While the groove $b$ serves to guide the knife perpendicularly down into the cheese and in to the slot $a$, the said slot serves as a fulcrum, or to sustain the point of the knife while it is used as a lever in cutting down through the cheese.

It is often the case that cheese is covered with cloth or has a very hard rind that renders it very difficult to be properly cut up into segmental pieces. By the use of my machine much labor and trouble is saved.

The board A may be used to receive the cheese instead of the additional or secondary board C, the board A being made to rest still upon a bench or table.

I do not claim the mere combination of a disk and spindle, but—

What I do claim as my invention, is—

1. The combination of the groove $b$ and the slot $a$, with the spindle and its sustaining board, so as to guide the point of the knife and support the pointed end of the knife when the knife is forced down through the cheese as stated.

2. And in combination with the groove $b$, slot $a$, and plate or board A, I claim the secondary rotary board C to be applied and used substantially in manner and for the purpose as specified.

In testimony whereof I have hereto set my signature, this second day of April, A. D. 1852.

W. K. FOSTER.

Witnesses:
R. H. EDDY,
G. W. CUTLER.